United States Patent
Li

(10) Patent No.: US 9,424,141 B2
(45) Date of Patent: Aug. 23, 2016

(54) HARD DISK DATA RECOVERY METHOD, APPARATUS, AND SYSTEM

(71) Applicant: Huawei Technologies Co., Ltd., Shenzhen, Guangdong (CN)

(72) Inventor: Yansong Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 196 days.

(21) Appl. No.: 14/307,141

(22) Filed: Jun. 17, 2014

(65) Prior Publication Data

US 2014/0298087 A1    Oct. 2, 2014

Related U.S. Application Data

(63) Continuation of application No. PCT/CN2012/084230, filed on Nov. 7, 2012.

(30) Foreign Application Priority Data

Apr. 28, 2012 (CN) .......................... 2012 1 0132095

(51) Int. Cl.
| | | |
|---|---|---|
| G06F 11/00 | (2006.01) | |
| G06F 11/14 | (2006.01) | |
| G11B 20/18 | (2006.01) | |
| G06F 11/20 | (2006.01) | |
| G06F 11/10 | (2006.01) | |

(52) U.S. Cl.
CPC ........ *G06F 11/1469* (2013.01); *G11B 20/1883* (2013.01); *G06F 11/1076* (2013.01); *G06F 11/2082* (2013.01); *G11B 20/1879* (2013.01); *G11B 2020/1893* (2013.01)

(58) Field of Classification Search
CPC . G06F 11/1076; G06F 11/1469; G06F 11/16; G06F 11/2082; G11B 20/1879; G11B 20/1883; G11B 20/1893

See application file for complete search history.

(56) References Cited

U.S. PATENT DOCUMENTS

| | | | |
|---|---|---|---|
| 5,166,936 A | 11/1992 | Ewert et al. | |
| 5,479,611 A | 12/1995 | Oyama | |
| 5,974,544 A | 10/1999 | Jeffries et al. | |
| 6,851,070 B1 * | 2/2005 | Rodrigues ............. | G06F 11/008 711/114 |
| 6,854,022 B1 * | 2/2005 | Thelin .................... | G06F 3/0611 369/53.1 |

(Continued)

FOREIGN PATENT DOCUMENTS

| | | |
|---|---|---|
| CN | 101751306 A | 6/2010 |
| CN | 101840364 A | 9/2010 |

(Continued)

*Primary Examiner* — Joshua P Lottich

(57) ABSTRACT

This invention discloses a hard disk data recovery method, apparatus, and system. The method includes: recording a logical block address corresponding to erroneous data if an error is discovered when data is read from the hard disk; performing a recovery operation for data at a first physical block address corresponding to the logical block address according to a preset algorithm to obtain recovered data; and sending an instruction of writing the recovered data into the logical block address to the hard disk so that the hard disk writes the recovered data into the logical block address according to the instruction, where the logical block address corresponds to a remapped second physical block address. Therefore, the method repairs an erroneous sector or a bad block of the hard disk quickly and improves efficiency of repairing the erroneous sector of the hard disk or the bad block of the hard disk.

12 Claims, 5 Drawing Sheets

(56) References Cited

U.S. PATENT DOCUMENTS

| | | | |
|---|---|---|---|
| 7,240,178 B2 | 7/2007 | Nakada et al. | |
| 7,617,358 B1* | 11/2009 | Liikanen | G11B 5/02 360/78.08 |
| 7,916,421 B1* | 3/2011 | Liikanen | G11B 19/045 360/77.01 |
| 2001/0010085 A1* | 7/2001 | Rafanello | G11B 20/1883 714/710 |
| 2004/0128442 A1* | 7/2004 | Hinshaw | G06F 11/2069 711/114 |
| 2004/0268179 A1* | 12/2004 | Stewart | G06F 11/2087 714/6.13 |
| 2005/0022051 A1* | 1/2005 | Zane | G06F 11/2058 714/6.12 |
| 2005/0050383 A1* | 3/2005 | Horn | G06F 11/2087 714/6.22 |
| 2005/0262400 A1* | 11/2005 | Nadeau | G11B 5/09 714/42 |
| 2005/0270943 A1* | 12/2005 | Blacquiere | G11B 7/00736 369/53.17 |
| 2005/0283655 A1* | 12/2005 | Ashmore | G06F 11/004 714/6.32 |
| 2006/0181994 A1* | 8/2006 | Blacquiere | G11B 20/1883 369/53.17 |
| 2006/0259812 A1 | 11/2006 | Chen | |
| 2007/0036055 A1 | 2/2007 | Ito | |
| 2007/0300101 A1* | 12/2007 | Stewart | G06F 11/2087 714/6.13 |
| 2008/0115017 A1 | 5/2008 | Jacobson | |
| 2008/0192595 A1* | 8/2008 | Ghotge | G11B 20/10 369/47.14 |
| 2009/0150599 A1 | 6/2009 | Bennett | |
| 2009/0172464 A1* | 7/2009 | Byrne | G06F 11/1092 714/5.11 |
| 2012/0084507 A1* | 4/2012 | Colgrove | G06F 11/1076 711/114 |
| 2013/0132770 A1 | 5/2013 | Guan | |
| 2013/0179726 A1* | 7/2013 | Liao | G06F 11/1088 714/6.22 |

FOREIGN PATENT DOCUMENTS

| | | |
|---|---|---|
| CN | 101903866 A | 12/2010 |
| CN | 101980137 A | 2/2011 |
| CN | 102708019 A | 10/2012 |
| EP | 1 594 123 A2 | 11/2005 |
| EP | 2 613 258 A1 | 7/2013 |
| JP | 2006120042 A | 5/2006 |
| WO | WO 2004/072815 A2 | 8/2004 |

* cited by examiner

HARD DISK DATA RECOVERY METHOD, APPARATUS, AND SYSTEM

CROSS-REFERENCE TO RELATED APPLICATIONS

This application is a continuation of International Application No. PCT/CN2012/084230, filed on Nov. 7, 2012, which claims priority to Chinese Patent Application No. 201210132095.3, filed on Apr. 28, 2012, both of which are hereby incorporated by reference in their entireties.

TECHNICAL FIELD

The present invention relates to the field of computer technologies, and in particular, to a hard disk data recovery method, apparatus, and system.

BACKGROUND

Currently, commonly used hard disks include mechanical hard disks and solid state disks. Mechanical hard disks tend to have read-write errors as affected by temperature and vibration, and solid state disks also tend to have read-write errors due to their bad block rates and inherent limitation on the number of times of erasure. Although a hard disk is capable of correcting errors, it can only correct erroneous data of few erroneous bits using its own error correction algorithm, and its error correction capability is limited.

In the prior art, when the erroneous data has excessive erroneous bits and the hard disk cannot correct errors using its own error correction algorithm, a storage controller mostly uses a RAID (Redundant Array of Independent Disks, redundant array of independent disks) algorithm to correct erroneous data, and performs a re-creation or formatting operation to recover hard disk data. If another hard disk in a hard disk array is erroneous in the re-creation operation process, the data in the hard disk is irrecoverable while a formatting operation requires reading and formatting of data on an entire track and requires data writing twice. The first time of writing data is to write the data on the entire track (including the data recovered by using a RAID algorithm and other data on the track that includes the erroneous data) into a reserved area, and the second time of writing data is to write the data on the entire track onto the formatted track, which leads to complex operations and consumes much time. In addition, the reserved area is used to store hard disk parameters and configuration information, and it is considerably risky to perform a data writing operation for the first time.

SUMMARY

Embodiments of the present invention provide a hard disk data recovery method, apparatus, and system, so as to improve efficiency of repairing erroneous sectors of a hard disk or bad blocks of the hard disk.

To solve the above technical issue, an embodiment of the present invention provides a hard disk data recovery method, where the method includes:

recording a logical block address corresponding to erroneous data and existing in a hard disk if an error is discovered when data is read from the hard disk;

performing a recovery operation for data at a first physical block address corresponding to the logical block address according to a preset algorithm to obtain recovered data; and sending an instruction of writing the recovered data into the logical block address to the hard disk so that the hard disk writes the recovered data into the logical block address according to the instruction, where the logical block address corresponds to a remapped second physical block address.

Correspondingly, an embodiment of the present invention further provides a hard disk data recovery apparatus, where the apparatus includes:

a recording module, configured to record a logical block address corresponding to erroneous data and existing in a hard disk if an error is discovered when data is read from the hard disk;

a recovering module, configured to perform a recovery operation for data at a first physical block address corresponding to the logical block address according to a preset algorithm to obtain recovered data; and a triggering module, configured to send an instruction of writing the recovered data into the logical block address to the hard disk so that the hard disk writes the recovered data into the logical block address according to the instruction, where the logical block address corresponds to a remapped second physical block address.

In addition, an embodiment of the present invention further provides a storage system, where the storage system includes a storage controller and a hard disk array communicatively connected to the storage controller, where the storage controller includes the hard disk data recovery apparatus provided in the embodiment of the present invention.

The embodiments of the present invention have the following beneficial effects:

In the embodiments of the present invention, a logical block address corresponding to erroneous data and existing in a hard disk is recorded if an error is discovered when data is read from the hard disk; a recovery operation is performed for data at a physical block address corresponding to the logical block address according to a preset algorithm to obtain recovered data; and an instruction of writing the recovered data into the logical block address is sent to the hard disk so that the hard disk writes the recovered data into the logical block address according to the instruction, where the logical block address corresponds to a remapped new physical block address. In this way, another sector or block (such as a sector in a redundant area of the hard disk) in the hard disk quickly and conveniently replaces the erroneous sector or block that includes the erroneous data, and the recovered data obtained according to the preset algorithm is written into a sector corresponding to the remapped new physical block address, thereby repairing the erroneous sector or the bad block of the hard disk quickly and improving efficiency of repairing the erroneous sector of the hard disk or the bad block of the hard disk.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
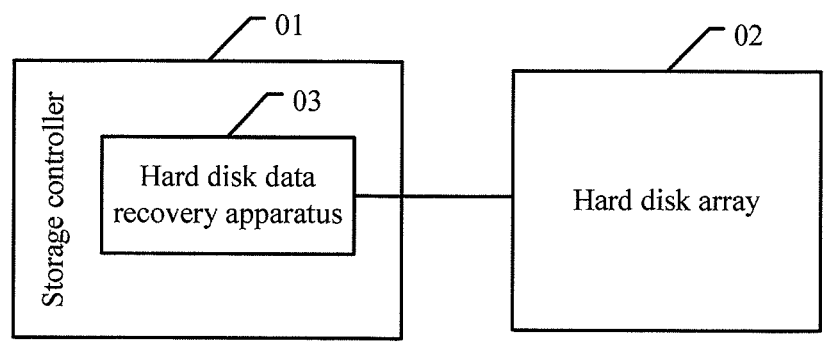
FIG. 1 is a schematic structural diagram of a storage system according to an embodiment of the present invention.

FIG. 1 is a schematic structural diagram of a storage system according to an embodiment of the present invention. The system includes a storage controller 01 and a hard disk array 02.

Specifically, the storage controller 01 includes a hard disk data recovery apparatus 03, and the hard disk array 02 may include at least two HDDs (Hard Disk Drive, mechanical hard disk) or SSDs (Solid State Drive, solid state disk).

The hard disk array 02 capable of detecting and correcting errors, such as RAID 1 or RAID 5, may be composed of at least two hard disks, and the storage controller 01 may use different error correction algorithms according to different hard disk arrays.

Specifically, the RAID 1 is also called a Mirror or Mirroring, where two hard disks make up a mirror and the two hard disks store the same data. The principle of the mirroring is that the data of one hard disk points to the location of the other hard disk according to the same location of the hard disk. When erroneous data occurs in one of the hard disks, the storage controller 01 can obtain the corresponding correct data from the other hard disk directly. The RAID 5 stores data in at least three hard disks in a strip manner. When erroneous data occurs in one of the hard disks, the storage controller 01 can obtain the corresponding correct data according to the data in other hard disks by using an XOR algorithm. These belong to the prior art and are not repeated here any further.

Figure 2:
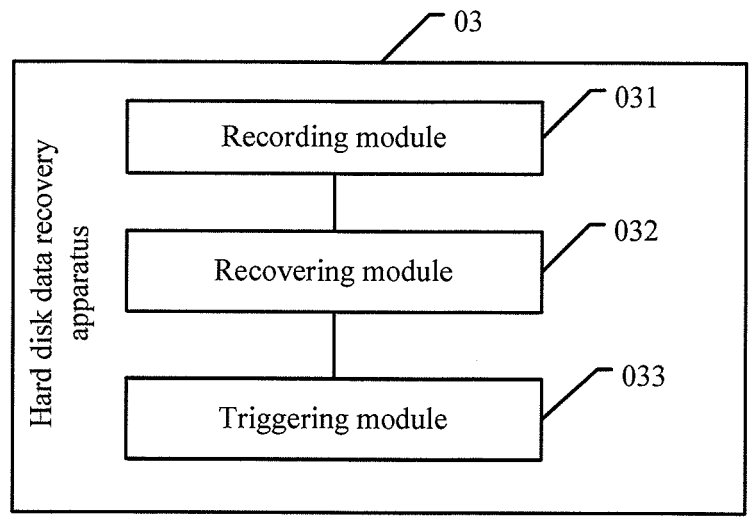
FIG. 2 is a schematic structural diagram of a hard disk data recovery apparatus according to an embodiment of the present invention.

Further, FIG. 2 is a schematic structural diagram of a hard disk data recovery apparatus 03 according to an embodiment of the present invention. The hard disk data recovery apparatus 03 is configured to: record a logical block address corresponding to erroneous data and existing in a hard disk if an error is discovered when data is read from the hard disk (a hard disk in the hard disk array 02); perform a recovery operation for data at a first physical block address corresponding to the logical block address according to a preset algorithm to obtain recovered data; and send an instruction of writing the recovered data into the logical block address to the hard disk so that the hard disk writes the recovered data into the logical block address according to the instruction, where the logical block address corresponds to a remapped second physical block address. A person of ordinary skill in the art should understand that the "preset algorithm" in the embodiment of the present invention may be a RAID error correction algorithm, and may also be other data recovery methods in other equivalent embodiments, which is not limited by the present invention.

Specifically, the hard disk data recovery apparatus 03 may include a recording module 031, a recovering module 032, and a triggering module 033.

The recording module 031 is configured to record a logical block address corresponding to erroneous data and existing in a hard disk if an error is discovered when data is read from the hard disk.

Specifically, in this embodiment, it is assumed that the hard disk data recovery apparatus 03 reads data from a hard disk A, and the hard disk A and another hard disk B form a hard disk array 02 that applies a RAID 1 algorithm as an error correction algorithm.

When reading data from the hard disk A, the hard disk data recovery apparatus 03 sends a logical block address (Logical Block Address, LBA) of the data to the hard disk A. If erroneous data occurs in the hard disk A, the hard disk A reports check error information to the hard disk data recovery apparatus 03, where the check error information includes the logical block address of the erroneous data. If erroneous data is discovered when the hard disk data recovery apparatus 03 reads data from the hard disk A, the recording module 031 records the logical block address corresponding to the erroneous data.

It should be noted that the erroneous data mentioned in the embodiment of the present invention refers to erroneous data that includes more bits than a preset threshold of the hard disk A and is uncorrectable by the error correction algorithm of the hard disk A. When the number of bits of the erroneous data is lower than the preset threshold, the hard disk A can obtain the corresponding correct data using its own error correction algorithm.

The recovering module 032 is configured to perform a recovery operation for data at a first physical block address corresponding to the logical block address according to a preset algorithm to obtain recovered data, where the logical block address is recorded by the recording module 031.

Specifically, corresponding to the hard disk array 02 that is formed by the hard disk A and another hard disk B and applies the RAID 1 algorithm as the error correction algorithm in this embodiment, the preset algorithm is RAID 1.

Definitely, according to the difference of the hard disk array 02, the algorithm used by the recovering module 032 to perform the recovery operation is different, which is not described here any further.

The recovering module 032 may use a RAID 1 algorithm to perform a recovery operation for the erroneous data discovered by the recording module 031, and obtain recovered data by reading correct data corresponding to the erroneous data, where the correct data is read in a physical block address in another normal hard disk B, and the physical block address corresponds to a logical block address that is the same as the logical block address recorded by the recording module 031.

The PBA (Physical Block Address, physical block address) is the address of a sector that actually includes the data in the hard disk, and the first physical block address is the address of the sector that includes the erroneous data in the hard disk A.

Specifically, each hard disk has an LBA (Logical Block Address, logical block address)-PBA mapping table for recording a correspondence relationship between the logical block address and the physical block address of the hard disk. Each logical block address has a corresponding physical block address.

The hard disk data recovery apparatus 03 accesses the hard disk A according to the logical block address. When reading data from the hard disk A, the hard disk data recovery apparatus 03 sends the logical block address that includes the data to the hard disk A. After entering the hard disk, the logical block address is translated into a physical block address according to the LBA-PBA mapping table, so that the hard disk data recovery apparatus 03 can perform addressing for an internal sector of the hard disk A.

The triggering module 033 is configured to send an instruction of writing the recovered data into the logical block address to the hard disk so that the hard disk writes the recovered data into the logical block address according to the instruction, where the recovered data is obtained by the recovering module 032, the logical block address is recorded by the recording module 031, and the logical block address corresponds to a remapped second physical block address.

Specifically, after the recovering module 032 obtains the recovered data, the triggering module 033 sends an instruction of writing the recovered data into the logical block address to the hard disk A so that the hard disk A writes the recovered data into the logical block address according to the instruction, where the recovered data is obtained by the recovering module 032, and the logical block address is recorded by the recording module 031.

The logical block address corresponds to a remapped second physical block address.

When the hard disk A writes the recovered data into the logical block address according to the instruction, where the recovered data is obtained by the recovering module 032 and the logical block address is recorded by the recording module 031, a remapping operation needs to be performed, that is, the recovered data obtained by the recovering module 032 needs to be written into a new physical block address in the hard disk A, where the new physical block address is the second physical block address. In this case, the LBA-PBA mapping table needs to be refreshed so that the second physical block address replaces the first physical block address. In this way, the erroneous data in the hard disk A is recovered.

Preferably, the second physical block address points to a physical block in a redundant area of the hard disk A. In other implementation manners, the second physical block address may also point to an idle physical block outside the redundant area in the hard disk A.

In this case, the physical block address corresponding to the logical block address has changed. However, because the hard disk data recovery apparatus 03 accesses the hard disk A according to the logical block address, the hard disk data recovery apparatus 03 cannot see the change of the physical block address, and can still access the hard disk A according to the logical block address, without bringing any impact to normal operations of the hard disk data recovery apparatus 03.

Figure 3:
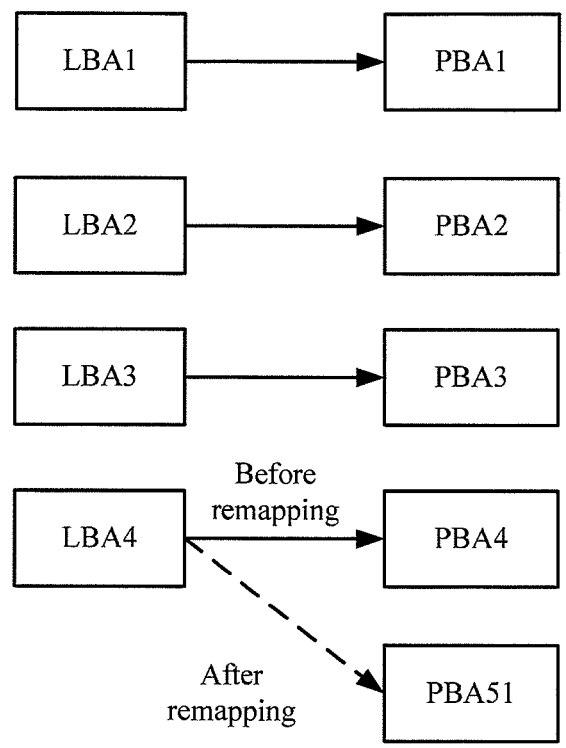
FIG. 3 is a schematic diagram of remapping between a logical block address and a physical block address according to an embodiment of the present invention.

It is assumed that the hard disk A has 60 physical block addresses in total, where physical block addresses 1-50 belong to a user area, and physical block addresses 51-60 belong to a redundant area. FIG. 3 is a schematic diagram of remapping between a logical block address and a physical block address; Table 1 is the LBA-PBA mapping table before the triggering module 033 sends the instruction of writing the recovered data into the logical block address to the hard disk A; and Table 2 is the LBA-PBA mapping table after the triggering module 033 sends the instruction of writing the recovered data into the logical block address to the hard disk A.

TABLE 1

| Logical block address | Physical block address |
|---|---|
| 1 | 1 |
| 2 | 2 |
| 3 | 3 |
| 4 | 4 |

TABLE 2

| Logical block address | Physical block address |
|---|---|
| 1 | 1 |
| 2 | 2 |
| 3 | 3 |
| 4 | 51 |

Figure 4:
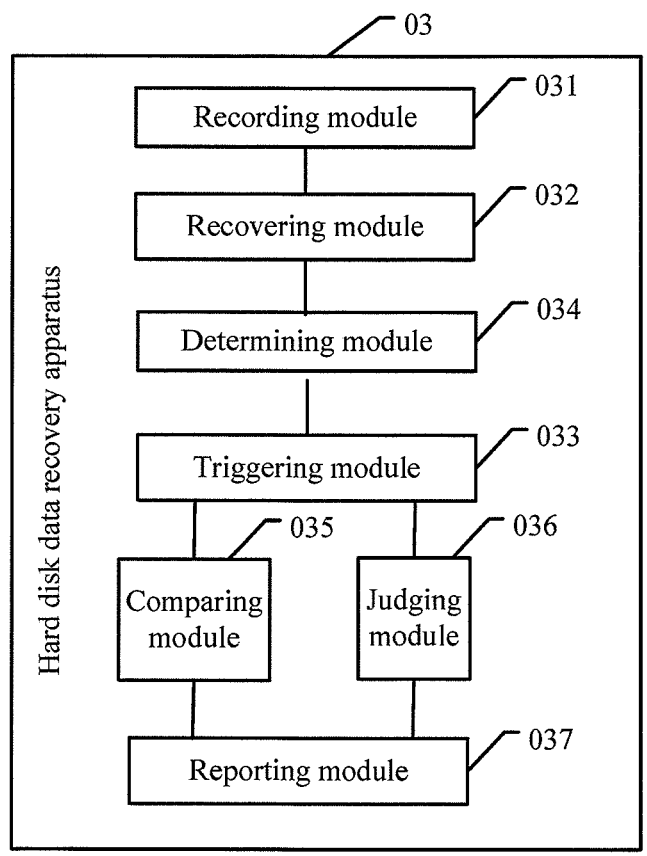
FIG. 4 is a schematic structural diagram of another hard disk data recovery apparatus according to an embodiment of the present invention.

Further, optionally, as shown in FIG. 4, which is another hard disk data recovery apparatus provided in an embodiment of the present invention, the hard disk data recovery apparatus 03 includes the recording module 031, the recovering module 032, and the triggering module 033 in the foregoing embodiment. In this embodiment, the hard disk data recovery apparatus 03 further includes a determining module 034.

The determining module 034 is configured to determine whether the redundant area of the hard disk has a free space; if the redundant area of the hard disk has a free space, perform the step of sending an instruction of writing the recovered data into the logical block address to the hard disk; or perform a hard disk re-creating operation if the redundant area of the hard disk has no free space.

Specifically, some redundant sectors are set when an HDD is designed. The hard disk data recovery apparatus 03 or upper layer software cannot see the redundant sectors, and only the hard disk itself can see the redundant sectors. The redundant sectors are used to replace the sectors of erroneous data.

Likewise, some redundant blocks are set when an SSD is designed. Each SSD is composed of multiple blocks, and each block includes multiple pages. A page is a minimum unit of reading and writing data in the SSD, and is equivalent to a sector of the HDD. A logical block address of the SSD corresponds to a page in the block. When a block is erased for excessive times, the block will fail and is no longer suitable for writing normally. In addition, a block may fail on the whole.

In the embodiment of the present invention, the redundant sector and the redundant block are uniformly called a redundant area.

Because the capacity of the redundant area in the hard disk is limited and different hard disk manufacturers set the redundant area differently, the redundant area may be deficient if there is much erroneous data and the remapping occurs for multiple times. In an S.M.A.R.T (Self Monitoring Analysis And Reporting Technology, self monitoring analysis and reporting technology) attribute, certain hard disks may provide some redundant area information, for example, the number of times the remapping has been performed, the number of remappings to be performed, and the free space of the redundant area, and so on.

To ensure successful writing of the recovered data into a redundant area of the hard disk A, the determining module 034 needs to determine whether a free space exists in the redundant area of the hard disk A.

Specifically, if determining that a free space exists in the redundant area of the hard disk A, the determining module 034 instructs the triggering module 033 to send an instruction of writing the recovered data into the logical block address to the hard disk so that the hard disk writes the recovered data into the logical block address according to the instruction, where the recovered data is obtained by the recovering module 032, and the logical block address is recorded by the recording module 031.

If the determining module 034 determines that no free space exists in the redundant area of the hard disk A, the hard disk A cannot perform a remapping operation, which indicates that an irreparable erroneous sector or bad block exists in the hard disk A, and the hard disk re-creating operation needs to be performed. Specifically, the hard disk data recovery apparatus 03 reads all data (including the recovered data obtained by the recovering module 032 and other data) in the hard disk A, and then writes the data into a hot standby disk uniformly. The hot standby disk refers to one or more hard disks that remain in a power-on state but do not participate in data reading or writing operations, where the one or more hard disks are preset in the hard disk array.

Definitely, according to a specific policy of the user, instead of performing the hard disk re-creating operation first, the hard disk data recovery apparatus 03 may perform no hard disk re-creating operation until the irrecoverable erroneous data accumulates to a certain amount, which belongs to the prior art and is not described here any further.

Further, optionally, as shown in FIG. 4, the hard disk data recovery apparatus 03 further includes:

a comparing module 035, configured to read the recovered data written into the logical block address, compare the recovered data with the recovered data obtained by the recovering module 032 by performing the recovery operation for the data at the first physical block address corresponding to the logical block address according to the preset algorithm, and determine whether the two are consistent; and, if consistent, indicate that the writing succeeds; or, if inconsistent, indicate that the writing fails, and perform the hard disk re-creating operation.

Specifically, errors may occur when the hard disk A writes the recovered data obtained by the recovering module 032 into the second physical block address. Therefore, to ensure correct writing of the recovered data, the hard disk data recovery apparatus 03 needs to perform a confirmation operation.

Therefore, the comparing module 035 reads the recovered data written by the hard disk A into the second logical block address, compares the recovered data with the recovered data obtained by the recovering module 032, and determines whether the two are consistent, so as to determine whether the recovered data is written correctly.

If the comparing module 035 determines that the recovered data written by the hard disk A into the second logical block address is inconsistent with the recovered data obtained by the recovering module 032, the hard disk data recovery apparatus 03 performs the hard disk re-creating operation.

Specifically, if the comparing module 035 determines that the recovered data written by the hard disk A into the second logical block address is inconsistent with the recovered data obtained by the recovering module 032, it indicates that the writing fails, and a possible reason is that a problem exists in the redundant area in the hard disk A. Consequently, the hard disk A cannot perform a remapping operation, which indicates that an irreparable erroneous sector or bad block exists in the hard disk A, and the hard disk re-creating operation needs to be performed. Specifically, the hard disk data recovery apparatus 03 reads all data (including the recovered data obtained by the recovering module 032 and other data) in the hard disk A, and then writes the data into a hot standby disk uniformly. The hot standby disk refers to one or more hard disks that remain in a power-on state but do not participate in data reading or writing operations, where the one or more hard disks are preset in the hard disk array.

Definitely, according to a specific policy of the user, instead of performing the hard disk re-creating operation first, the hard disk data recovery apparatus 03 may perform no hard disk re-creating operation until the irrecoverable erroneous data accumulates to a certain amount, which belongs to the prior art and is not described here any further.

Further, as shown in FIG. 4, the hard disk data recovery apparatus 03 further includes:

a judging module 036, configured to determine whether the hard disk has reported check error information; if not, indicate that the writing succeeds; or, if yes, indicate that the writing fails, and perform the hard disk re-creating operation.

Specifically, the hard disk data recovery apparatus 03 may also use the judging module 036 to determine whether the hard disk A has reported check error information, so as to determine whether the recovered data is written correctly.

To ensure reliability of data reading and writing, each sector of the HDD stores data and error detecting and correcting codes corresponding to the data. When the data is ready for being written into a sector, the HDD calculates the corresponding error detecting and correcting code first, and then writes it together with the data. When the data is read, the error detecting and correcting code is read concurrently, and the hard disk performs a check. If the check fails, it indicates that the data is erroneous. If the number of bits of the erroneous data is small, for example, not more than 20 bytes in each sector, the HDD can correct the erroneous data using its own error correction algorithm, and the read data is still correct. If the data has excessive erroneous bits and cannot be corrected, the HDD reports check error information to the hard disk data recovery apparatus 03 connected to the HDD, and assigns an error correction task to the hard disk data recovery apparatus 03.

Likewise, the SSD is generally composed of many flash memory particles. Although the SSD is physically other than a concept of a sector, the SSD can store the data and the error detecting and correcting code corresponding to the data onto each flash memory particle, thereby implementing a similar error tolerance function. Definitely, the error correction capability of the SSD is also limited.

Therefore, by using the judging module 036 to determine whether the hard disk A has reported the check error information, it may be determined whether the recovered data is written correctly.

If the judging module 036 determines that the hard disk A has reported the check error information, the hard disk data recovery apparatus 03 performs a hard disk re-creating operation.

Specifically, if the judging module 036 determines that the hard disk A has reported the check error information, it indicates that the writing fails, and a possible reason is that a problem exists in a redundant area in the hard disk A, and the recovery of the erroneous data fails, which indicates that an irreparable erroneous sector or bad block exists in the hard disk A, and the hard disk re-creating operation needs to be performed. Specifically, the hard disk data recovery apparatus 03 reads all data (including the recovered data obtained by the recovering module 032 and other data) in the hard disk A, and then writes the data into a hot standby disk uniformly. The hot standby disk refers to one or more hard disks that remain in a power-on state but do not participate in data reading or writing operations, where the one or more hard disks are preset in the hard disk array.

Definitely, according to a specific policy of the user, instead of performing the hard disk re-creating operation first, the hard disk data recovery apparatus 03 may perform no hard disk re-creating operation until the irrecoverable erroneous data accumulates to a certain amount, which belongs to the prior art and is not described here any further.

Further, as shown in FIG. 4, the hard disk data recovery apparatus 03 further includes:

a reporting module 037, configured to report the recovered data obtained by the recovering module 032 to an operating system so that the operating system implements a corresponding service according to the recovered data.

Specifically, when the recovering module 032 obtains the recovered data according to a preset algorithm, the reporting module 037 reports the recovered data to an operating system so that the operating system implements a corresponding service according to the recovered data.

It should be noted that the foregoing module division is merely exemplary, and, according to the method described in the embodiments of the present invention, a person of ordinary skill in the art can obtain other module division manners to implement the present invention.

In summary, in the embodiments of the present invention, a logical block address corresponding to erroneous data and existing in a hard disk is recorded if an error is discovered when data is read from the hard disk; a recovery operation is performed for data at a physical block address corresponding to the logical block address according to a preset algorithm to obtain recovered data; and an instruction of writing the recovered data into the logical block address is sent to the hard disk so that the hard disk writes the recovered data into the logical block address according to the instruction, where the logical block address corresponds to a remapped new physical block address. In this way, another sector or block (such as a sector in a redundant area of the hard disk) in the hard disk quickly and conveniently replaces the erroneous sector or block that includes the erroneous data, and the recovered data obtained according to the preset algorithm is written into a sector corresponding to the remapped new physical block address, thereby repairing the erroneous sector or the bad block of the hard disk quickly and improving efficiency of repairing the erroneous sector of the hard disk or the bad block of the hard disk.

Figure 5:
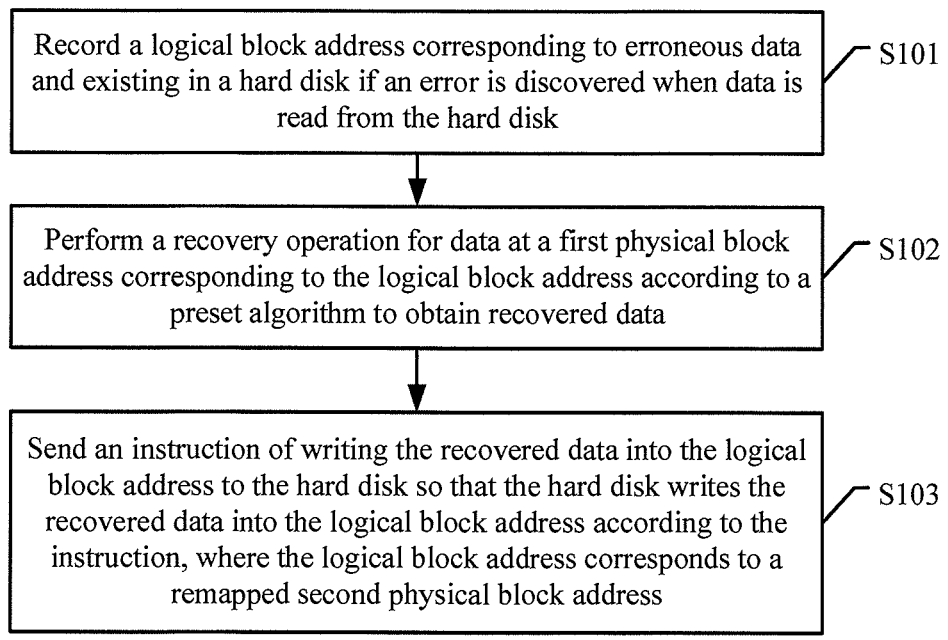
FIG. 5 is a schematic flowchart of a hard disk data recovery method according to an embodiment of the present invention.

FIG. 5 is a schematic flowchart of a hard disk data recovery method according to an embodiment of the present invention, where the method includes:

S101. Record a logical block address corresponding to erroneous data and existing in a hard disk if an error is discovered when data is read from the hard disk.

Specifically, in this embodiment, it is assumed that the data is read from a hard disk A, and the hard disk A and another hard disk B form a hard disk array that applies a RAID 1 algorithm as an error correction algorithm.

When reading data from the hard disk A, the hard disk data recovery apparatus sends a logical block address of the data to the hard disk A. If erroneous data occurs in the hard disk A, the hard disk A reports check error information to the hard disk data recovery apparatus, where the check error information includes the logical block address of the erroneous data. If erroneous data is discovered when the hard disk data recovery apparatus reads data from the hard disk A, the logical block address corresponding to the erroneous data is recorded.

It should be noted that the erroneous data mentioned in the embodiment of the present invention refers to erroneous data that includes more bits than a preset threshold of the hard disk A and is uncorrectable by the error correction algorithm of the hard disk A. When the number of bits of the erroneous data is lower than the preset threshold, the hard disk A can obtain the corresponding correct data using its own error correction algorithm.

S102. Perform a recovery operation for data at a first physical block address corresponding to the logical block address according to a preset algorithm to obtain recovered data.

Specifically, corresponding to the hard disk array that is formed by the hard disk A and another hard disk B and applies the RAID 1 algorithm as the error correction algorithm in this embodiment, the preset algorithm is RAID 1.

Definitely, according to the difference of the hard disk array, the algorithm used by the hard disk data recovery apparatus to perform the recovery operation is different, which is not described here any further.

The hard disk data recovery apparatus uses a RAID 1 algorithm to perform a recovery operation for the erroneous data, and obtains recovered data by reading correct data corresponding to the erroneous data, where the correct data is read in a physical block address corresponding to the same logical block address in another normal hard disk B.

The physical block address is the address of a sector that actually includes the data in the hard disk, and the first physical block address is the address of the sector that includes the erroneous data in the hard disk A.

Specifically, each hard disk has an LBA-PBA mapping table for recording a correspondence relationship between the logical block address and the physical block address of the hard disk. Each logical block address has a corresponding physical block address.

The hard disk data recovery apparatus accesses the hard disk A according to the logical block address. When reading data from the hard disk A, the hard disk data recovery apparatus sends the logical block address that includes the data to the hard disk A. After entering the hard disk, the logical block address is translated into a physical block address according to the LBA-PBA mapping table, so that the hard disk data recovery apparatus can perform addressing for an internal sector of the hard disk A.

S103. Send an instruction of writing the recovered data into the logical block address to the hard disk so that the hard disk writes the recovered data into the logical block address according to the instruction, where the logical block address corresponds to a remapped second physical block address.

Specifically, after obtaining the recovered data, the hard disk data recovery apparatus sends an instruction of writing the recovered data into the logical block address to the hard disk A so that the hard disk A writes the recovered data into the logical block address according to the instruction, where the logical block address corresponds to a remapped second physical block address.

When the hard disk A writes the recovered data into the logical block address according to the instruction, a remapping operation needs to be performed, that is, the recovered data needs to be written into a new physical block address in the hard disk A, so that the second physical block address is obtained. In this case, the LBA-PBA mapping table needs to be refreshed so that the second physical block address replaces the first physical block address. In this way, the erroneous data in the hard disk A is recovered.

Preferably, the second physical block address points to a physical block in a redundant area of the hard disk A. In other implementation manners, the second physical block address may also point to an idle physical block outside the redundant area in the hard disk A.

In this case, the physical block address corresponding to the logical block address has changed. However, because the hard disk data recovery apparatus accesses the hard disk according to the logical block address, the hard disk data recovery apparatus cannot see the change of the physical block address, and can still access the hard disk according to the logical block address, without bringing any impact to normal operations of the hard disk data recovery apparatus.

For the LBA-PBA mapping table before the hard disk data recovery apparatus sends an instruction of writing the recovered data into the logical block address to the hard disk A, refer to Table 1 again; and, for the LBA-PBA mapping table after the hard disk data recovery apparatus sends the instruction of writing the recovered data into the logical block address to the hard disk A, refer to Table 2 again.

In the embodiment of the present invention, a logical block address corresponding to erroneous data and existing in a hard disk is recorded if an error is discovered when data is read from the hard disk; a recovery operation is performed for data at a physical block address corresponding to the logical block address according to a preset algorithm to obtain recovered data; and an instruction of writing the recovered data into the logical block address is sent to the hard disk so that the hard disk writes the recovered data into the logical block address according to the instruction, where the logical block address corresponds to a remapped new physical block address. In this way, another sector or block (such as a sector in a redundant area of the hard disk) in the hard disk quickly and conveniently replaces the erroneous sector or block that includes the erroneous data, and the recovered data obtained according to the preset algorithm is written into a sector corresponding to the remapped new physical block address, thereby repairing the erroneous sector or the bad block of the hard disk quickly and improving efficiency of repairing the erroneous sector of the hard disk or the bad block of the hard disk.

Figure 6:
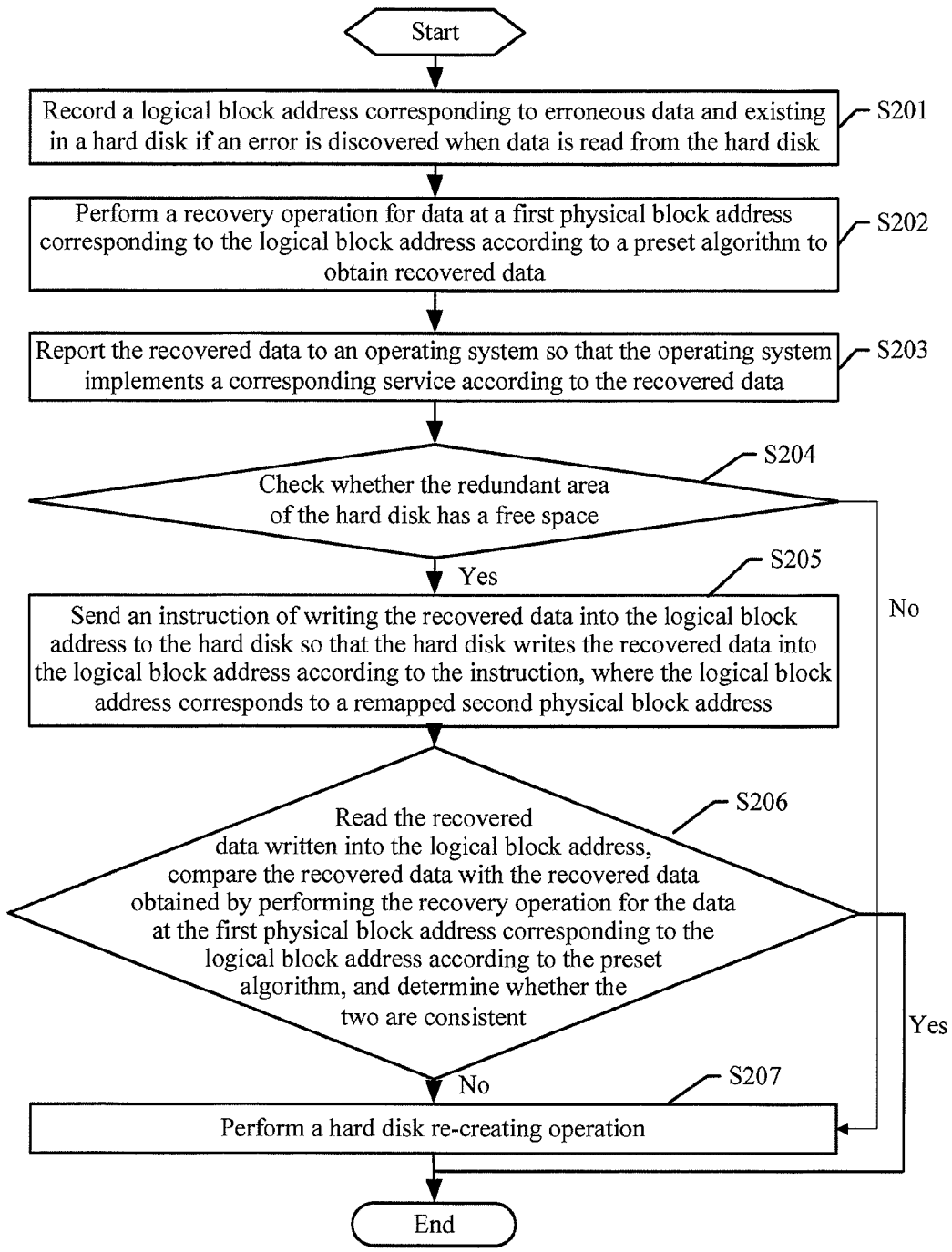
FIG. 6 is a schematic flowchart of another hard disk data recovery method according to an embodiment of the present invention.

FIG. 6 is a schematic flowchart of another hard disk data recovery method according to an embodiment of the present invention, where the method includes:

S201. Record a logical block address corresponding to erroneous data and existing in a hard disk if an error is discovered when data is read from the hard disk.

S202. Perform a recovery operation for data at a first physical block address corresponding to the logical block address according to a preset algorithm to obtain recovered data.

S203. Report the recovered data to an operating system so that the operating system implements a corresponding service according to the recovered data.

Specifically, when the hard disk data recovering module obtains the recovered data according to a preset algorithm, the recovered data is reported to an operating system so that the operating system implements a corresponding service according to the recovered data.

S204. Determine whether the redundant area of the hard disk has a free space; and, if yes, perform S205; otherwise, perform S207.

Specifically, some redundant sectors are set when an HDD is designed. The hard disk data recovery apparatus or upper layer software cannot see the redundant sectors, and only the hard disk itself can see the redundant sectors. The redundant sectors are used to replace the sectors of erroneous data.

Likewise, some redundant blocks are set when an SSD is designed. Each SSD is composed of multiple blocks, and each block includes multiple pages. A page is a minimum unit of reading and writing data in the SSD, and is equivalent to a sector of the HDD. A logical block address of the SSD corresponds to a page in the block. When a block is erased for excessive times, the block will fail and is no longer suitable for writing normally. In addition, a block may fail on the whole.

In the embodiment of the present invention, the redundant sector and the redundant block are uniformly called a redundant area.

Because the capacity of the redundant area in the hard disk is limited and different hard disk manufacturers set the redundant area differently, the redundant area may be deficient if there is much erroneous data and the remapping occurs for multiple times. In an S.M.A.R.T attribute, certain hard disks may provide some redundant area information, for example, the number of times the remapping has been performed, the number of remappings to be performed, and the free space of the redundant area, and so on.

To ensure successful writing of the recovered data into a redundant area of the hard disk, it is necessary to determine whether a free space exists in the redundant area of the hard disk.

Specifically, if the hard disk data recovery apparatus determines that no free space exists in the redundant area of the hard disk, the hard disk cannot perform a remapping operation, which indicates that an irreparable erroneous sector or bad block exists in the hard disk, and S207 needs to be performed.

Definitely, according to a specific policy of the user, instead of performing the hard disk re-creating operation first, the hard disk data recovery apparatus may perform no hard disk re-creating operation until the irrecoverable erroneous data accumulates to a certain amount, which belongs to the prior art and is not described here any further.

S205. Send an instruction of writing the recovered data into the logical block address to the hard disk so that the hard disk writes the recovered data into the logical block address according to the instruction, where the logical block address corresponds to a remapped second physical block address.

S206. Read the recovered data written into the logical block address, compare the recovered data with the recovered data obtained by performing the recovery operation for the data at the first physical block address corresponding to the logical block address according to the preset algorithm, and determine whether the two are consistent; and, if yes, indicate that the writing succeeds, and end the procedure; otherwise, perform S207.

Specifically, errors may occur when the hard disk writes the recovered data into the second physical block address. Therefore, to ensure correct writing of the recovered data, the hard disk data recovery apparatus needs to perform a confirmation operation.

Therefore, the hard disk data recovery apparatus reads the written recovered data, compares the recovered data with the recovered data obtained according to the preset algorithm, and determines whether the two are consistent, so as to determine whether the recovered data is written correctly.

Further, optionally, by judging whether the hard disk has reported check error information, it may be determined whether the recovered data is written correctly.

S207. Perform a hard disk re-creating operation.

Specifically, if it is determined that the written recovered data is inconsistent with the recovered data obtained according to the preset algorithm, it indicates that the writing fails. A possible reason is that a problem exists in the redundant area in the hard disk, and the hard disk cannot perform a remapping operation, which indicates that an irreparable erroneous sector or bad block exists in the hard disk, and the hard disk re-creating operation needs to be performed. All data (including the recovered data obtained according to the preset algorithm and other data) in the hard disk is read, and then the data is written into a hot standby disk uniformly. The hot standby disk refers to one or more hard disks that remain in a power-on state but do not participate in data reading or writing operations, where the one or more hard disks are preset in the hard disk array.

Further, optionally, if it is determined that the hard disk has reported check error information to the storage controller, it indicates that the writing fails, and S207 also needs to be performed.

Definitely, according to a specific policy of the user, instead of performing the hard disk re-creating operation first, no hard disk re-creating operation is performed until the irrecoverable erroneous data accumulates to a certain amount, which belongs to the prior art and is not described here any further.

In the embodiment of the present invention, a logical block address corresponding to erroneous data and existing in a hard disk is recorded if an error is discovered when data is read from the hard disk; a recovery operation is performed for data at a physical block address corresponding to the logical block address according to a preset algorithm to obtain recovered data; and an instruction of writing the recovered data into the logical block address is sent to the hard disk so that the hard disk writes the recovered data into the logical block address according to the instruction, where the logical block address corresponds to a remapped new physical block address. In this way, another sector or block (such as a sector in a redundant area of the hard disk) in the hard disk quickly and conveniently replaces the erroneous sector or block that includes the erroneous data, and the recovered data obtained according to the preset algorithm is written into a sector corresponding to the remapped new physical block address, thereby repairing the erroneous sector or the bad block of the hard disk quickly and improving efficiency of repairing the erroneous sector of the hard disk or the bad block of the hard disk.

According to the description of the foregoing implementation manners, a person skilled in the art can clearly understand that the present invention can be implemented by software plus a necessary hardware platform, or by hardware alone. Based on such understanding, all or a part of the technical solutions of the present invention contributing to the background may be implemented in a form of a software product. The computer software product may be stored in a storage medium such as a ROM/RAM, a magnetic disk, or an optical disc, and includes several instructions for instructing a computer device (which may be a personal computer, a server, a network device, or the like) to execute the method described in all or part of the embodiments of the present invention.

The content disclosed above is merely exemplary embodiments of the present invention, but is not intended to limit the protection scope of the present invention. A person of ordinary skill in the art can understand that implementations of all or a part of the procedures of the foregoing embodiments, and equivalent modifications made according to the claims of the present invention shall still fall within the protection scope of the present invention.

What is claimed is:

1. A hard disk data recovery method applied to a storage controller, the method comprising:
   recording a logical block address corresponding to erroneous data and existing in a hard disk if an error is discovered when data is read from the hard disk;
   performing a recovery operation for data at a first physical block address corresponding to the logical block address according to a preset algorithm to obtain recovered data; and
   sending an instruction of writing the recovered data into the logical block address to the hard disk so that the hard disk writes the recovered data into the logical block address according to the instruction, wherein the logical block address corresponds to a remapped second physical block address;
   wherein a hard disk storage area corresponding to the second physical block address exists in a redundant area of the hard disk;
   wherein before sending the instruction of writing the recovered data into the logical block address to the hard disk, and after performing the recovery operation, the method further comprises:
      determining whether the redundant area of the hard disk has a free space;
      sending the instruction of writing the recovered data into the logical block address to the hard disk when the redundant area of the hard disk has a free space; and
      performing a hard disk re-creating operation when the redundant area of the hard disk has no free space.

2. The method according to claim 1, wherein: after performing the recovery operation, the method further comprises:
   reporting the recovered data to an operating system so that the operating system implements a corresponding service according to the recovered data.

3. A hard disk data recovery method applied to a storage controller, the method comprising:
   recording a logical block address corresponding to erroneous data and existing in a hard disk if an error is discovered when data is read from the hard disk;
   performing a recovery operation for data at a first physical block address corresponding to the logical block address according to a preset algorithm to obtain recovered data; and
   sending an instruction of writing the recovered data into the logical block address to the hard disk so that the hard disk writes the recovered data into the logical block address according to the instruction, wherein the logical block address corresponds to a remapped second physical block address;
   wherein: after sending the instruction of writing the recovered data into the logical block address to the hard disk, the method further comprises:
      reading the recovered data written into the logical block address, comparing the recovered data with the recovered data obtained by performing the recovery operation and determining whether the two are consistent; and
      indicating that the writing succeeds when the two are consistent; or, indicating that the writing fails, and performing the hard disk re-creating operation when the two are inconsistent.

4. A hard disk data recovery method applied to a storage controller, the method comprising:
   recording a logical block address corresponding to erroneous data and existing in a hard disk if an error is discovered when data is read from the hard disk;
   performing a recovery operation for data at a first physical block address corresponding to the logical block address according to a preset algorithm to obtain recovered data; and
   sending an instruction of writing the recovered data into the logical block address to the hard disk so that the hard disk writes the recovered data into the logical block address according to the instruction, wherein the logical block address corresponds to a remapped second physical block address;

wherein: after sending the instruction of writing the recovered data into the logical block address to the hard disk the method further comprises:
determining whether the hard disk has reported check error information; and
indicating that the writing succeeds when the hard disk has not reported the check error information; or, indicating that the writing fails, and performing the hard disk re-creating operation when the hard disk has reported the check error information.

5. A computer apparatus comprising a non-transitory memory and a processor configured to process a program stored in the non-transitory memory, wherein the program comprises:
 a recording module, configured to record a logical block address corresponding to erroneous data and existing in a hard disk if an error is discovered when data is read from the hard disk;
 a recovering module, configured to perform a recovery operation for data at a first physical block address corresponding to the logical block address according to a preset algorithm to obtain recovered data, wherein the logical block address is recorded by the recording module; and
 a triggering module, configured to send an instruction of writing the recovered data into the logical block address to the hard disk so that the hard disk writes the recovered data into the logical block address according to the instruction, wherein the recovered data is obtained by the recovering module, the logical block address is recorded by the recording module, and the logical block address corresponds to a remapped second physical block address;
 wherein a hard disk storage area corresponding to the second physical block address exists in a redundant area of the hard disk, and the program further comprises:
  a determining module, configured to determine whether the redundant area of the hard disk has a free space; send the instruction of writing the recovered data into the logical block address to the hard disk when the redundant area of the hard disk has a free space; or perform a hard disk re-creating operation when the redundant area of the hard disk has no free space.

6. The apparatus according to claim 5, wherein the program further comprises:
 a reporting module, configured to report the recovered data obtained by the recovering module to an operating system so that the operating system implements a corresponding service according to the recovered data.

7. A computer apparatus comprising a non-transitory memory and a processor configured to process a program stored in the non-transitory memory, wherein the program comprises:
 a recording module, configured to record a logical block address corresponding to erroneous data and existing in a hard disk if an error is discovered when data is read from the hard disk;
 a recovering module, configured to perform a recovery operation for data at a first physical block address corresponding to the logical block address according to a preset algorithm to obtain recovered data, wherein the logical block address is recorded by the recording module;
 a triggering module, configured to send an instruction of writing the recovered data into the logical block address to the hard disk so that the hard disk writes the recovered data into the logical block address according to the instruction, wherein the recovered data is obtained by the recovering module, the logical block address is recorded by the recording module, and the logical block address corresponds to a remapped second physical block address; and
 a comparing module, configured to read the recovered data written into the logical block address, compare the recovered data with the recovered data obtained by the recovering module by performing the recovery operation, and determine whether the two are consistent; and, indicate that the writing succeeds when the two are consistent; or, indicate that the writing fails, and perform the hard disk re-creating operation when the two are inconsistent.

8. A computer apparatus comprising a non-transitory memory and a processor configured to process a program stored in the non-transitory memory, wherein the program comprises:
 a recording module, configured to record a logical block address corresponding to erroneous data and existing in a hard disk if an error is discovered when data is read from the hard disk;
 a recovering module, configured to perform a recovery operation for data at a first physical block address corresponding to the logical block address according to a preset algorithm to obtain recovered data, wherein the logical block address is recorded by the recording module;
 a triggering module, configured to send an instruction of writing the recovered data into the logical block address to the hard disk so that the hard disk writes the recovered data into the logical block address according to the instruction, wherein the recovered data is obtained by the recovering module, the logical block address is recorded by the recording module, and the logical block address corresponds to a remapped second physical block address; and
 a judging module, configured to determine whether the hard disk has reported check error information; indicate that the writing succeeds when the hard disk has not reported the check error information; or, indicate that the writing fails, and perform the hard disk re-creating operation when the hard disk has not reported the check error information.

9. A storage system comprising:
 a hard disk; and
 a storage controller coupled to the hard disk, the storage controller comprising:
  a processor; and
  memory coupled to the processor, the memory comprising instructions that, when executed by the processor, cause the storage controller to:
   record a logical block address corresponding to erroneous data and existing in the hard disk if an error is discovered when data is read from the hard disk;
   perform a recovery operation for data at a first physical block address corresponding to the logical block address according to a preset algorithm to obtain recovered data, wherein the logical block address is recorded by the recording module; and
   send an instruction of writing the recovered data into the logical block address to the hard disk so that the hard disk writes the recovered data into the logical block address according to the instruction, wherein the logical block address corresponds to a remapped second physical block address;

wherein a hard disk storage area corresponding to the second physical block address exists in a redundant area of the hard disk, the memory further comprising instructions that, when executed by the processor, cause the storage controller to:

determine whether the redundant area of the hard disk has a free space; send the instruction of writing the recovered data into the logical block address to the hard disk when the redundant area of the hard disk has a free space; or perform a hard disk re-creating operation when the redundant area of the hard disk has no free space.

10. The storage system according to claim 9, comprising instructions that, when executed by the processor, cause the storage controller to:

read the recovered data written into the logical block address, compare the recovered data with the recovered data obtained by performing the recovery operation, and determine whether the two are consistent; and, indicate that the writing succeeds when the two are consistent; or, indicate that the writing fails, and perform the hard disk re-creating operation when the two are inconsistent.

11. The storage system according to claim 9, comprising instructions that, when executed by the processor, cause the storage controller to:

determine whether the hard disk has reported check error information; indicate that the writing succeeds when the hard disk has not reported the check error information; or, indicate that the writing fails, and perform the hard disk re-creating operation when the hard disk has not reported the check error information.

12. The storage system according to claim 9, comprising instructions that, when executed by the processor, cause the storage controller to:

report the recovered data to an operating system so that the operating system implements a corresponding service according to the recovered data.

* * * * *